US012183255B2

(12) United States Patent
Wang

(10) Patent No.: US 12,183,255 B2
(45) Date of Patent: Dec. 31, 2024

(54) DISPLAY METHOD AND DISPLAY DEVICE OF DISPLAY PANEL

(71) Applicant: TCL CHINA STAR OPTOELECTRONICS TECHNOLOGY CO., LTD., Guangdong (CN)

(72) Inventor: Haokai Wang, Guangdong (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/307,039

(22) Filed: Apr. 26, 2023

(65) Prior Publication Data

US 2024/0212566 A1 Jun. 27, 2024

(30) Foreign Application Priority Data

Dec. 22, 2022 (CN) ........................ 202211658565.X

(51) Int. Cl.
*G09G 3/20* (2006.01)
*G09G 5/10* (2006.01)

(52) U.S. Cl.
CPC ............. *G09G 3/2092* (2013.01); *G09G 3/20* (2013.01); *G09G 5/10* (2013.01); *G09G 2310/08* (2013.01); *G09G 2320/0233* (2013.01); *G09G 2320/0247* (2013.01); *G09G 2320/0626* (2013.01); *G09G 2330/021* (2013.01)

(58) Field of Classification Search
CPC .... G09G 3/20; G09G 3/2092; G09G 2310/08; G09G 2320/0233; G09G 2320/0247; G09G 2320/0626; G09G 2330/021; G09G 5/10
See application file for complete search history.

(56) References Cited

U.S. PATENT DOCUMENTS

2018/0151109 A1* 5/2018 Shim ........................ G09G 3/32
2019/0180695 A1* 6/2019 Ha ........................ G09G 3/2051
2020/0410942 A1* 12/2020 Kim ........................ G09G 3/20
2021/0287595 A1* 9/2021 An ........................ G09G 3/2092
2023/0386378 A1* 11/2023 Zhao ........................ G09G 3/20

FOREIGN PATENT DOCUMENTS

CN 112542124 A * 3/2021 ............... G09G 3/20

* cited by examiner

*Primary Examiner* — Nitin Patel
*Assistant Examiner* — Cory A Almeida
(74) *Attorney, Agent, or Firm* — PV IP PC; Wei Te Chung

(57) ABSTRACT

A display method of a display panel includes determining whether the display panel is in a frequency conversion state, if the display panel is in a frequency conversion state, acquiring a first frequency and a second frequency corresponding to two adjacent frames consecutively for multiple times, determining whether the display panel is in a first display mode according to a difference between the first frequency and the second frequency obtained multiple times, and if the display panel is in the first display mode, turn off a brightness adjustment function of the display panel.

14 Claims, 5 Drawing Sheets

DISPLAY METHOD AND DISPLAY DEVICE OF DISPLAY PANEL

CROSS REFERENCE TO RELATED APPLICATION

This application claims the priority of Chinese Patent Application No. 202211658565.X, entitled "DISPLAY METHOD AND DISPLAY DEVICE OF DISPLAY PANEL", filed on Dec. 22, 2022, the disclosure of which is incorporated herein by reference in its entirety.

FIELD OF THE DISCLOSURE

The present invention relates to the field of display technologies, and more particularly, to a display method and a display device.

BACKGROUND

Free-sync (game intelligent display) technology enables a graphics card and an accelerator processor to directly and dynamically control a refresh rate of a display to reduce or completely eliminate stuttering, blurring, and tearing when playing games and videos. However, for a display device equipped with free-sync technology, a charging time of each frame is fixed, and a duration of each frame is longer at a low frame rate, a blanking interval corresponding to a low refresh rate is longer. A longer blanking interval may cause a brightness of the display panel to change. Although the brightness variation can be improved by frequency switching in a short period of time, the hopping of different frequencies may cause brightness differences, causing flickering issues. By adjusting the voltage, the brightness compensation of the low-frequency area can be realized, and the flicker issue in a ramp mode (that is, a refresh frequency gradually changes from low frequency to high frequency and jumps to the lowest frequency when reaching the highest frequency) can be improved. However, in a saw mode (that is, the refresh rate gradually changes from low frequency to high frequency, and then gradually changes from high frequency to low frequency), if the method of adjusting brightness by voltage is still used to improve the flicker issue, it may result in changing from low frequency to high frequency or there may be a jump in brightness at each frequency change node from high frequency to low frequency. Even if the brightness jump corresponds to the minimum accuracy of voltage adjustment, it may be affected by the adjustment accuracy of the power management chip, resulting in jumps and flickers visible to the human eye.

SUMMARY

Embodiments of the present invention provide a display method and a display device of a display panel, which can improve a flickering issue caused by brightness adjustment.

An embodiment of the present invention provides a display method of a display panel, the display panel has a first display mode, a frequency of the display panel in the first display mode gradually changes, and the display method of the display panel comprises:

- determining whether the display panel is in a frequency conversion state;
- if the display panel is in the frequency conversion state, acquiring a first frequency and a second frequency corresponding to two adjacent frames consecutively for multiple times;

- determining whether the display panel is in the first display mode according to a difference between the first frequency and the second frequency obtained multiple times; and
- if the display panel is in the first display mode, turn off a brightness adjustment function of the display panel.

Optionally, in some embodiments of the present invention, a step of determining whether the display panel is in the first display mode according to the difference between the first frequency and the second frequency obtained multiple times comprises:

determining whether an absolute value of the difference between the first frequency and the second frequency acquired each time is less than a setting threshold for frequency mode;

if the absolute value of the difference between the first frequency and the second frequency acquired N consecutive times is less than the setting threshold for frequency mode, determining that the display panel is in the first display mode, wherein N is a frame number for display mode determination.

Optionally, in some embodiments of the present invention, the frame number for display mode determination is determined according to a first initial frequency and a second initial frequency when the display panel is in the frequency conversion state; the first initial frequency and the second initial frequency are respectively the first frequency and the second frequency corresponding to the two adjacent frames acquired for a first time; and the first initial frequency corresponds to a frame preceding the two adjacent frames, and the second initial frequency corresponds to a frame following the two adjacent frames.

Optionally, in some embodiments of the present invention, when the difference between the first initial frequency and the second initial frequency is greater than 0 and less than the frequency mode setting threshold, the frame number for display mode determination is equal to a highest frequency of the display panel corresponding to the first display mode.

Optionally, in some embodiments of the present invention, when the difference between the second initial frequency and the first initial frequency is greater than or equal to 0 and less than the frequency mode setting threshold, the frame number for display mode determination is equal to twice a highest frequency of the display panel corresponding to the first display mode.

Optionally, in some embodiments of the present invention, C>(fmax−fmin)/step; and C represents the frequency mode setting threshold, fmax and fmin respectively represent a highest frequency and a lowest frequency corresponding to the display panel in the first display mode, and step represents a number of frequency gradients corresponding to a frequency transition from the lowest frequency to the highest frequency in the first display mode of the display panel.

Optionally, in some embodiments of the present invention, the step of determining whether the display panel is in the first display mode according to the difference between the first frequency and the second frequency obtained multiple times further comprises: if the absolute value of the difference between the first frequency and the second frequency is greater than the frequency mode setting threshold, determining that the display panel is not in the first display mode;

the display method further comprises:

when the display panel is not in the first display mode, controlling the brightness adjustment function of the display panel to be in an on state.

Optionally, in some embodiments of the present invention, before a step of if the display panel is in the frequency conversion state, acquiring the first frequency and the second frequency corresponding to the two adjacent frames consecutively for multiple times further comprises: controlling the brightness adjustment function of the display panel to be in an on state.

An embodiment of the present invention also provides a display device comprising a display panel, a timing controller, and a power management chip. The display panel has a first display mode, and a frequency of the display panel in the first display mode gradually changes. The timing controller is configured to acquire a first frequency and a second frequency corresponding to two adjacent frames multiple times, determine whether the display panel is in the first display mode according to a difference between the first frequency and the second frequency obtained multiple times, and output a voltage adjustment off signal when the display panel is in the first display mode. The power management chip is configured to receive the voltage adjustment off signal to stop outputting an adjustment voltage to the display panel, thereby stopping a brightness adjustment function of the display panel.

Optionally, in some embodiments of the present invention, the timing controller is configured to acquire the first frequency and the second frequency corresponding to the two adjacent frames 2fmax times and determine that the display panel is in the first display mode when an absolute value of the difference between the first frequency and the second frequency obtained each time is less than a frequency mode setting threshold;

wherein the frequency mode setting threshold represents C>(fmax−fmin)/step; and wherein fmax and fmin respectively represent a highest frequency and a lowest frequency corresponding to the display panel in the first display mode, and step represents a number of frequency gradients corresponding to a frequency transition from the lowest frequency to the highest frequency in the first display mode of the display panel.

The present invention provides a display method and a display device of a display panel. In the display method of the display panel, when the display panel is in the frequency conversion state, the first frequency and the second frequency corresponding to two adjacent frames are continuously acquired multiple times. Whether the display panel is in the first display mode is determined according to the difference between the first frequency and the second frequency obtained multiple times. When it is determined that the display panel is in the first display mode, the brightness adjustment function of the display panel is turned off to improve the flickering issue caused by brightness adjustment. The display device includes a display panel with a first display mode, a timing controller configured to output a voltage adjustment shutdown signal when the display panel is in the first display mode, and a power management chip configured to receive a voltage regulation off signal to stop outputting the regulation voltage to the display panel. Therefore, the brightness adjustment function of the display panel is stopped in the first display mode.

BRIEF DESCRIPTION OF THE DRAWINGS

In order to more clearly illustrate the technical solutions in the embodiments of the present application, the following briefly introduces the drawings that need to be used in the description of the embodiments. Apparently, the drawings in the following description are only some embodiments of the present application. For those skilled in the art, other drawings can also be obtained based on these drawings without any creative effort.

DETAILED DESCRIPTION

Figure 1A:
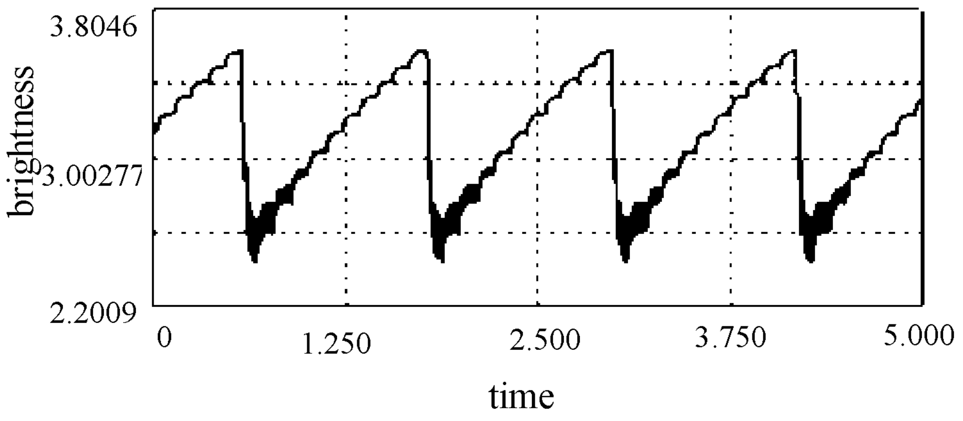
FIG. 1A to FIG. 1D are brightness change curves of a display panel before and after brightness adjustment.

The technical solutions in the embodiments of the present application will be clearly and completely described below in conjunction with the drawings in the embodiments of the present application. Apparently, the described embodiments are only some of the embodiments of this application, not all of them. Based on the embodiments in this application, all other embodiments obtained by those skilled in the art without making creative efforts belong to the scope of protection of this application. In addition, it should be understood that the specific implementations described here are only used to illustrate and explain the present application and are not intended to limit the present application. In this application, unless stated to the contrary, the used orientation words such as “up” and “down” usually refer to up and down in the actual use or working state of the device, specifically the direction of the drawing in the drawings. The “inside” and “outside” refer to the outline of the installation.

Figure 1B:
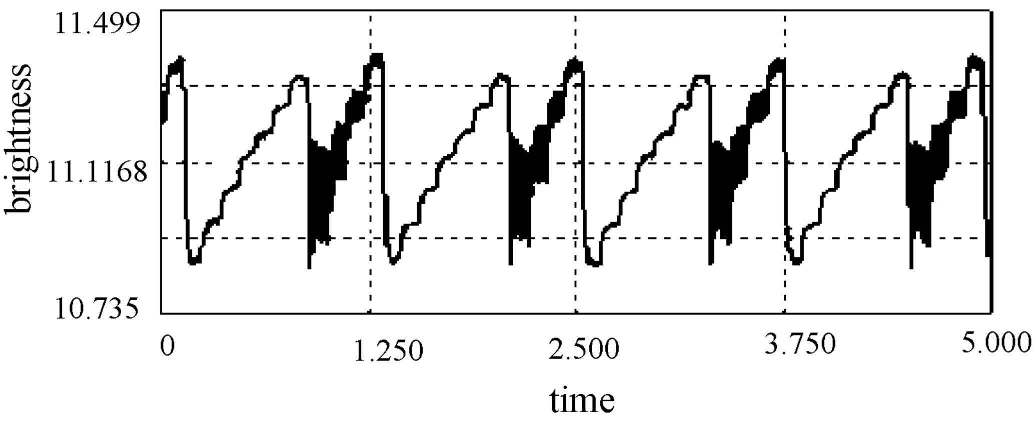
Figure 1C:
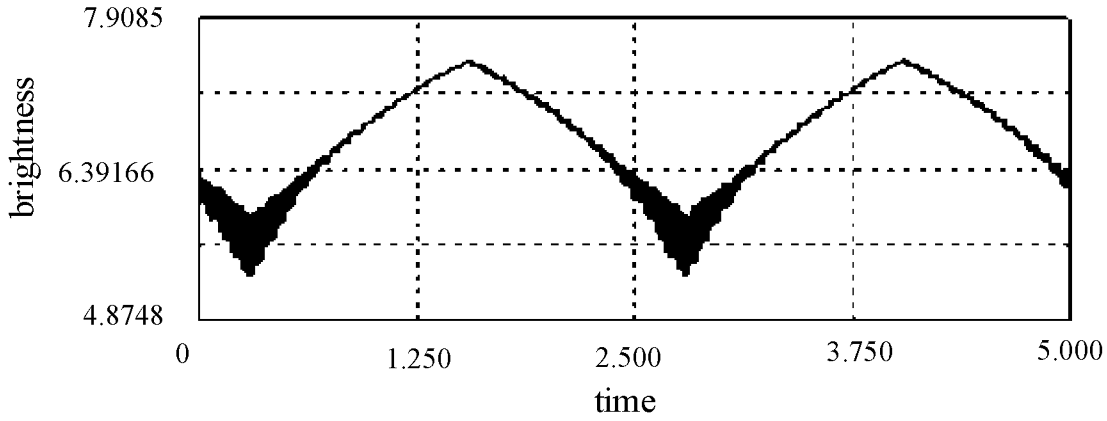
Figure 1D:
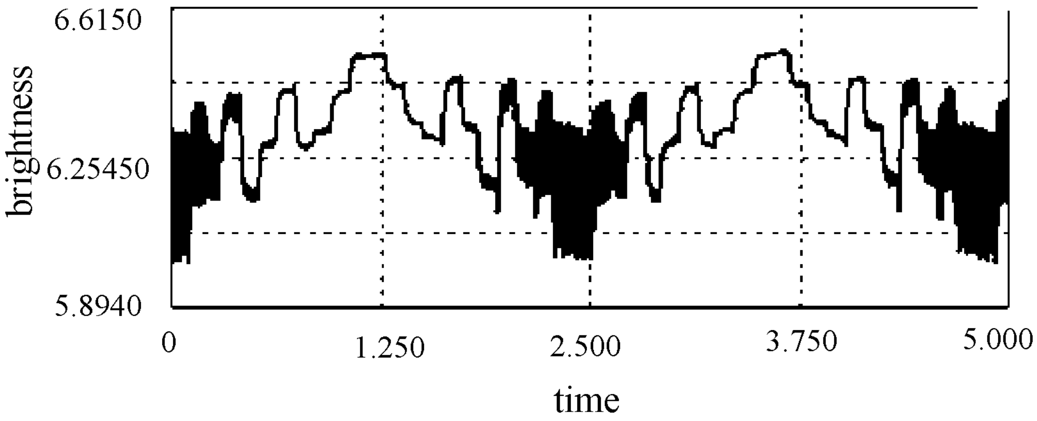

Specifically, FIG. 1A to FIG. 1D are brightness change curves of a display panel before and after brightness adjustment. FIG. 1A is a brightness change curve of the display panel in a ramp mode (that is, a refresh frequency gradually changes from low frequency to high frequency and jumps to the lowest frequency when reaching the highest frequency) without using a brightness adjustment function. FIG. 1B is a brightness change curve of the display panel when the brightness adjustment function is used in the ramp mode (that is, the refresh frequency gradually changes from low frequency to high frequency and jumps to the lowest frequency when it reaches the highest frequency). FIG. 1C is a brightness change curve of the display panel in a saw mode (that is, the refresh frequency gradually changes from low frequency to high frequency, and then gradually changes from high frequency to low frequency) without using the brightness adjustment function. FIG. 1D is a brightness change curve of the display panel when the brightness adjustment function is used in the saw mode (that is, the refresh frequency gradually changes from low frequency to high frequency, and then gradually changes from high frequency to low frequency).

Since the frequency change of the display panel in the ramp mode gradually changes from low frequency to high frequency and jumps to the lowest frequency when reaching the highest frequency. Therefore, in the process of gradually changing from low frequency to high frequency, the brightness change of the display panel in the ramp mode also increases gradually. When the highest frequency jumps to the lowest frequency, the brightness of the display panel also jumps (as shown in FIG. 1A), which makes the human eyes feel severe flicker. By adjusting the voltage of the low frequency band, the brightness of the low frequency band can be increased, so as to compensate for the jumping issue of the brightness of the display panel when the highest frequency jumps to the lowest frequency (as shown in FIG. 1B).

In the saw mode, since the frequency keeps changing gradually, the brightness of the display panel also keeps changing accordingly (as shown in FIG. 1C). The gradual change in brightness does not cause obvious brightness jumps visible to the human eye. However, if the brightness adjustment function is still used in the saw mode, then at the node of the frequency gradient, the brightness jump of the display panel may be greater than that when the brightness adjustment function is not enabled (as shown in FIG. 1D), and affected by the adjustment accuracy of the power management chip, when the brightness adjustment function is enabled, the brightness jump of the display panel in the saw mode may be visible to human eyes.

In order to improve the flickering issue of the display panel due to brightness adjustment, the present invention provides a display method and a display device of the display panel.

Figure 2:
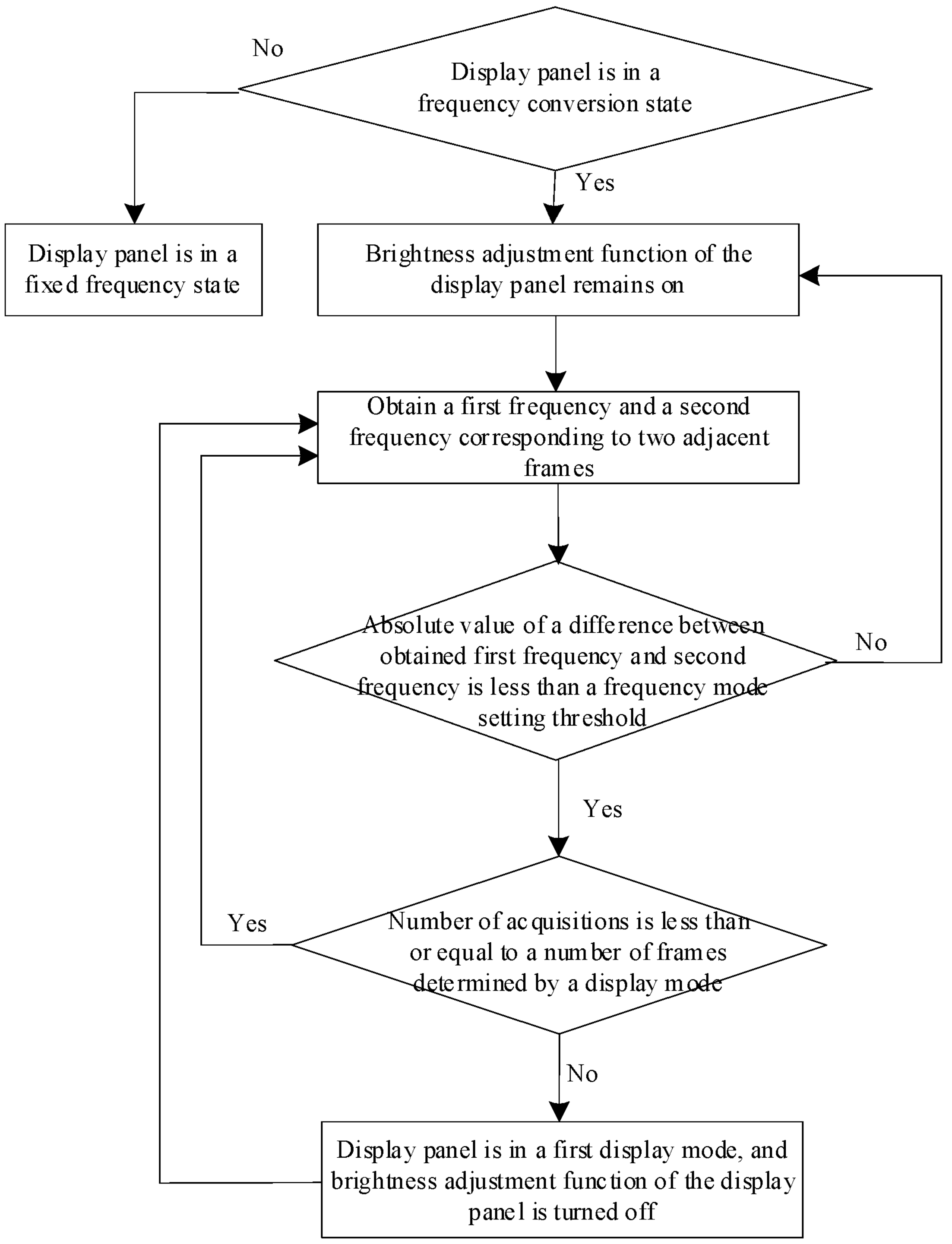
FIG. 2 is a flowchart of a display method of a display panel provided by an embodiment of the present invention.

Specifically, FIG. 2 is a flowchart of a display method of a display panel provided by an embodiment of the present invention. The invention provides a display method of a display panel. The display panel has a first display mode, and a frequency of the display panel in the first display mode changes gradually.

Optionally, the first display mode is a saw mode.

The display method of the display panel includes determining whether the display panel is in a frequency conversion state.

Optionally, it may be determined whether the display panel is in a frequency conversion state according to the refresh frequency of the display panel. For example, it can be determined whether the display panel is in the frequency conversion state by comparing whether the refresh frequencies corresponding to two adjacent frames are equal. Specifically, when the refresh rates corresponding to two adjacent frames are equal, the display panel is in a fixed-frequency display state. When the refresh rates corresponding to two adjacent frames of pictures are not equal, the display panel is in a frequency conversion state.

Optionally, it may be determined according to the frame rate whether the display panel is in a frequency conversion state.

Because when a free-sync function is enabled on the display panel, the refresh frequency of the display panel may vary with the frame rate (That is, the refresh rate of the display panel is adjusted synchronously according to the frame rate, so that the refresh rate of the display panel is consistent with the frame rate). Therefore, in the first display mode of the display panel, it can be determined whether the display panel is in the frequency conversion state by detecting the change of the frame rate or the refresh frequency of the display panel.

Optionally, the control module can be used to determine whether the display panel is in a frequency conversion state. Optionally, the control module includes a timing controller. The timing controller can be used to detect the change of the frame rate, and then obtain the change of the refresh rate of the display panel. Therefore, it is determined whether the display panel is in a frequency conversion state according to the change of the refresh frequency of the display panel.

After it is determined that the display panel is in the frequency conversion state, it may be further determined whether the display panel is in the first display mode according to a frequency change manner of the display panel in the first display mode.

That is, the display method of the display panel also includes:

if the display panel is in the frequency conversion state, acquiring the first frequency and the second frequency corresponding to two adjacent frames consecutively for multiple times;

determining whether the display panel is in the first display mode according to the difference between the first frequency and the second frequency obtained multiple times;

if the display panel is in the first display mode, turn off the brightness adjustment function of the display panel.

Optionally, the frequency gradient of the display panel in the first display mode may be a fixed gradient frequency, or a variable gradient frequency. That is, the display panel correspondingly has a highest frequency fmax and a lowest frequency fmin in the first display mode. When the display panel changes gradually from the lowest frequency fmin to the highest frequency fmax (or from the highest frequency fmax to the lowest frequency fmin) in the first display mode, the number of frequency changes step is n times. Then, during the n times of gradation, the frequency span of each gradation can be different or the same.

Optionally, the highest frequency fmax includes 360 Hz, 240 Hz, 210 Hz, 180 Hz, 165 Hz, 120 Hz and so on. The minimum frequency fmin may be 45 Hz, 48 Hz, 50 Hz, 55 Hz, 60 Hz and so on.

Figure 3:
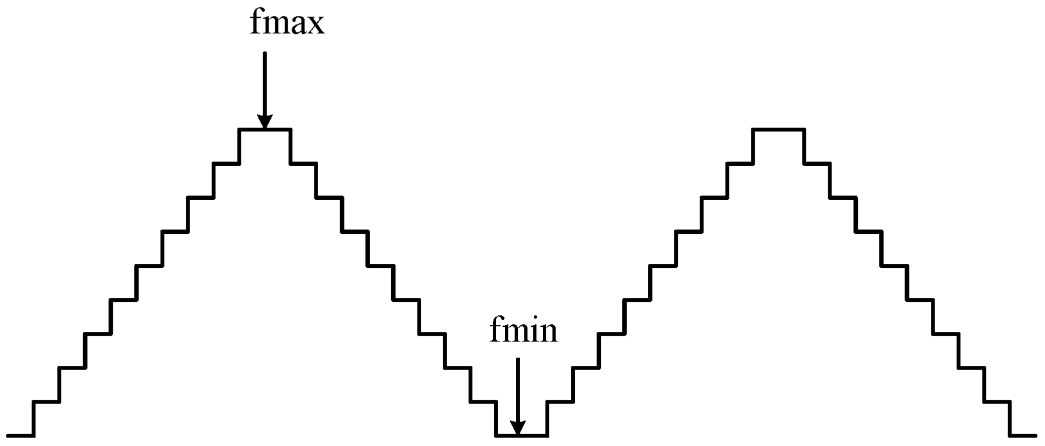
FIG. 3 is a schematic diagram of a frequency gradient of a display panel in a first display mode provided by an embodiment of the present invention.

FIG. 3 is a schematic diagram of the frequency gradient of the display panel provided by the embodiment of the present invention in the first display mode. The highest frequency fmax of the display panel in the first display mode is 165 Hz, and the lowest frequency fmin is 48 Hz. When the display panel changes from the lowest frequency fmin to the highest frequency fmax (or from the highest frequency fmax to the lowest frequency fmin) in the first display mode, the frequency step is 10 times as example. When the display panel changes at a fixed frequency in the first display mode, the frequency span of each change may be equal to (165−48)/10. Therefore, if the difference between the first frequency and the second frequency obtained each time is less than or equal to the corresponding frequency span in the fixed frequency gradual change mode, it can be determined that the display panel is in the first display mode.

When the display panel is in the first display mode with changing frequency gradients, there is also a maximum frequency span. Therefore, if the difference between the first frequency and the second frequency acquired each time is less than or equal to the maximum frequency span corresponding to the changing frequency gradient mode (the maximum frequency span may be smaller than the difference between the highest frequency fmax and the lowest frequency fmin, so it is different from the non-first display mode (such as ramp mode)), then it can be determined that the display panel is in the first display mode.

It can be understood that when the display panel changes from the lowest frequency fmin to the highest frequency fmax (or from the highest frequency fmax to the lowest frequency fmin) in the first display mode, there may be some frames on a frequency gradient. In addition, the refresh rates corresponding to at least two frames on the frequency gradient step may be the same. That is, the absolute value of the difference between the first frequency and the second frequency may be equal to zero.

Therefore, the frequency mode setting threshold C can be set, and according to the relationship between the absolute value of the difference between the first frequency and the second frequency acquired each time and the frequency mode setting threshold C to determine whether the display panel in the first display mode.

That is, the step of determining whether the display panel is in the first display mode according to the difference between the first frequency and the second frequency obtained multiple times includes:

determining whether the absolute value of the difference between the first frequency and the second frequency obtained each time is less than the frequency mode setting threshold C;

if the absolute value of the difference between the first frequency and the second frequency acquired N consecutive times is smaller than the frequency mode setting threshold C, it is determined that the display panel is in the first display mode, wherein N is the frame number for display mode determination.

Optionally, the frequency mode setting threshold C is set to be larger than the frequency span. For example, when the display panel changes gradually at a fixed frequency in the first display mode, the frequency mode setting threshold $C>(fmax-fmin)/step$. fmax and fmin respectively represent the highest frequency and the lowest frequency corresponding to the display panel in the first display mode. step represents the number of frequency gradients corresponding to the frequency transition from the lowest frequency to the highest frequency in the first display mode of the display panel. For example, fmax=165 Hz, fmin=48 Hz, step=10, then the frequency mode setting threshold C>12. Optionally, the frequency mode setting threshold C is equal to 13, 14, 15, 16 and so on. Optionally, when the display panel is in the first display mode, the frequency changes gradually, the frequency mode setting threshold C may be larger than a maximum frequency span and smaller than a difference between the highest frequency fmax and the lowest frequency fmin corresponding to the display panel in the first display mode.

Optionally, after each acquisition of the first frequency and the second frequency corresponding to two adjacent frames, the difference between the acquired first frequency and the second frequency is correspondingly determined once. Whether the absolute value is smaller than the frequency mode setting threshold C. Repeat N times in a row. If the absolute value of the difference between the first frequency and the second frequency obtained each time is less than the frequency mode setting threshold C, it is determined that the display panel is in the first display mode, as shown in FIG. 2.

If the absolute value of the difference between the first frequency and the second frequency obtained multiple times is smaller than the frequency mode setting threshold C at least once, it indicates that the display panel is not in the first display mode. Correspondingly, the display panel keeps the brightness adjustment function in an on state. Therefore, the step of determining whether the display panel is in the first display mode according to the difference between the first frequency and the second frequency acquired each time further includes: if the acquired absolute value of the difference between the first frequency and the second frequency is greater than the frequency mode setting threshold C, it is determined that the display panel is not in the first display mode. The display method further includes when the display panel is not in the first display mode, controlling the brightness adjustment function of the display panel to be in an on state.

Since the display panel is in the first display mode, the change from the highest frequency fmax to the lowest frequency fmin is gradual. It is different from the frequency change trend in the non-first display mode (for example, in the ramp mode, the change from the highest frequency to the lowest frequency is jumping). In the first display mode of the display panel, the change from the lowest frequency fmin to the highest frequency fmax is gradual. The frequency change trend is the same as that in the non-first display mode (for example, in the ramp mode, the change from the lowest frequency to the highest frequency is gradual). Therefore, in order to avoid misjudgment of whether the display panel is in the first display mode, the influence of the brightness adjustment function on the brightness of the display panel in the first display mode is reduced as soon as possible. The display mode determination frame number can be determined according to the frequency gradient period of the display panel in the first display mode.

Optionally, the number of frames for determining the display mode is determined according to a first initial frequency and a second initial frequency when the display panel is in the frequency conversion state. The first initial frequency and the second initial frequency are respectively the first frequency and the second frequency corresponding to two adjacent frames acquired for the first time. The first initial frequency corresponds to a frame preceding two adjacent frames, and the second initial frequency corresponds to a frame following two adjacent frames (That is, the frame display time corresponding to the first initial frequency is earlier than the frame display time corresponding to the second initial frequency).

That is, if the display panel is in the frequency conversion state, the step of acquiring multiple first frequencies and multiple second frequencies corresponding to multiple adjacent two frames in succession includes:

if the display panel is in the frequency conversion state, according to the first initial frequency and the second initial frequency, determine the display mode to determine the number of frames;

the first frequency and the second frequency corresponding to the plurality of adjacent two frames are continuously acquired multiple times by using the number of frames for determining the display mode as the number of acquisitions.

Optionally, the acquisition times can be counted by a counter. When the absolute value of the obtained difference between the first frequency and the second frequency is determined to be smaller than the frequency mode setting threshold C, the counter is incremented by one. When one of the absolute values of the difference between the first frequency and the second frequency acquired multiple times is smaller than the frequency mode setting threshold C, the counter is cleared. The display panel keeps the brightness adjustment function in an on state.

Optionally, the first frequency and the second frequency corresponding to two adjacent frames may be acquired each time, the difference between the acquired first frequency and the second frequency may be determined correspondingly once, and after the absolute value is less than the frequency mode setting threshold C, it is determined once whether the number of acquisitions is less than or equal to the number of frames for display mode determination. If the number of times of acquisition is less than or equal to the number of display mode determination frames, continue to acquire the first frequency and the second frequency corresponding to two adjacent frames, and enter a loop state. If the number of acquisition times is greater than the frame number for display mode determination, it is determined that the display panel is in the first display mode, as shown in FIG. 2.

Optionally, if the display panel is in the frequency conversion state, the step of determining the number of frames for determining the display mode according to the first initial frequency and the second initial frequency includes: if the display panel is in the frequency conversion state, when the difference between the first initial frequency and the second initial frequency is greater than 0 and less than the frequency mode setting threshold C, the frame number for display mode determination is equal to the highest frequency fmax of the display panel corresponding to the first display mode.

That is, the difference between the first initial frequency and the second initial frequency is greater than 0 and less than the frequency mode setting threshold C. It indicates that the frequency gradual change period of the displayed panel in the first display mode is within the first gradual change period from the highest frequency fmax to the lowest frequency fmin. Because the frequency change trend in the first display mode is different from the frequency change trend in the non-first display mode. Therefore, the number of frames for determining the display mode may be equal to the highest frequency fmax of the display panel corresponding to the first display mode. Within a unit duration (for example, 1 second duration), the change of the refresh frequency that is the same as the display frame number of the display panel is acquired continuously. For example, fmax=165 Hz, then the display mode determines that the number of frames is equal to 165.

Optionally, if the display panel is in the frequency conversion state, the step of determining the number of frames for determining the display mode according to the first initial frequency and the second initial frequency includes:

if the display panel is in the frequency conversion state, when the difference between the second initial frequency and the first initial frequency is greater than or equal to 0 and less than the frequency mode setting threshold C, the number of display mode determination frames is equal to twice the highest frequency fmax of the display panel corresponding to the first display mode.

That is, when the difference between the second initial frequency and the first initial frequency is greater than or equal to 0 and less than the frequency mode setting threshold C. This indicates that the frequency gradual change period of the displayed panel in the first display mode is within a second gradual change period from the lowest frequency fmin to the highest frequency fmax. Because the frequency change trend in the first display mode is similar to the frequency change trend in the non-first display mode. Therefore, in order to avoid misjudgment, the number of frames for display mode determination may be equal to twice the highest frequency fmax of the display panel corresponding to the first display mode. The change of the refresh frequency which is the same as the display frame number of the display panel is acquired continuously within 2 unit durations (For example, 2 seconds. Within 1 second of the 2 seconds, the refresh frequency of the display panel in the first display mode changes from the lowest frequency fmin to the highest frequency fmax. During the 2 seconds Within another 1 second, the refresh rate of the display panel in the first display mode changes from the highest frequency fmax to the lowest frequency fmin). For example, fmax=165 Hz, then the display mode determines that the number of frames is equal to 330.

Optionally, before it is determined that the display panel is determined to be in the first display mode, the display panel may also be in a mode other than the first display mode. Therefore, in order to avoid the flickering problem that occurs before the display panel is determined to be in the first display mode, the brightness adjustment function of the display panel can be controlled to be in an on state. That is, before the step of acquiring the first frequency and the second frequency corresponding to two adjacent frames in a row if the display panel is in the frequency conversion state, it also includes: controlling the brightness adjustment function of the display panel to be in an on state.

It can be understood that both the display mode determination frame number and the frequency mode setting threshold C can be set according to actual requirements.

Optionally, when the display panel is in the first display mode, the control module may output a voltage adjustment shutdown signal to the power management chip. This causes the power management chip to stop outputting the adjustment voltage to the display panel, thereby stopping the brightness adjustment function of the display panel.

Figure 4:
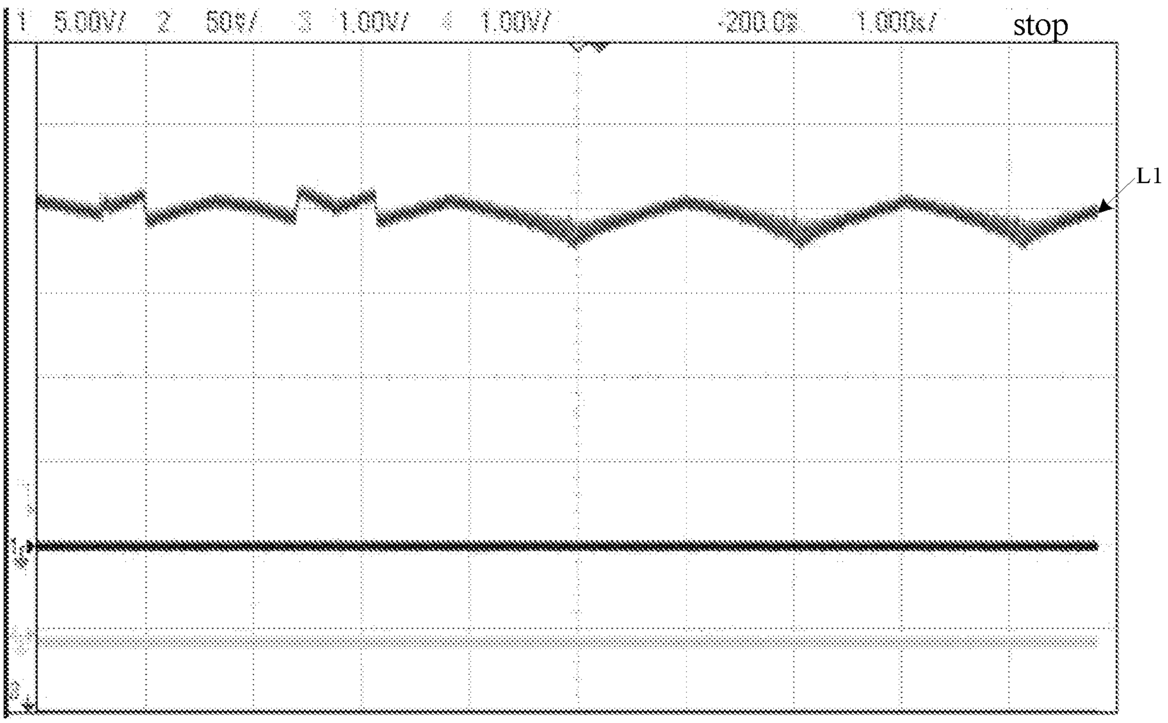
FIG. 4 is a test luminance effect diagram of a display method using a display panel provided by an embodiment of the present invention.

FIG. 4 is a test luminance effect diagram of a display method using a display panel provided by an embodiment of the present invention. The brightness variation of the display panel in the first display mode is measured by CA410 and a free space bias detector (photo Sensor). This proves that the number of frames determined by the display mode and the threshold C set by the frequency mode are set reasonably in the present application. This can realize the judgment that the display panel is in the first display mode and can turn off the brightness adjustment function when the display panel is in the first display mode. That is, it can be known from the brightness change curve L1 of the display panel in the first display mode shown in FIG. 4. After the display panel is determined to be in the first display mode, the brightness jump problem caused by the brightness adjustment function is improved. Therefore, the present application can compensate for the flickering problem of the display panel equipped with the free-sync technology during frequency switching. This can also compensate the flickering problem caused by the brightness adjustment function of the display panel equipped with free-sync technology in the first display mode and can improve the display quality of the display panel.

The present invention also provides a display device, which adopts the display method of the above-mentioned display panel to realize display.

Figure 5:
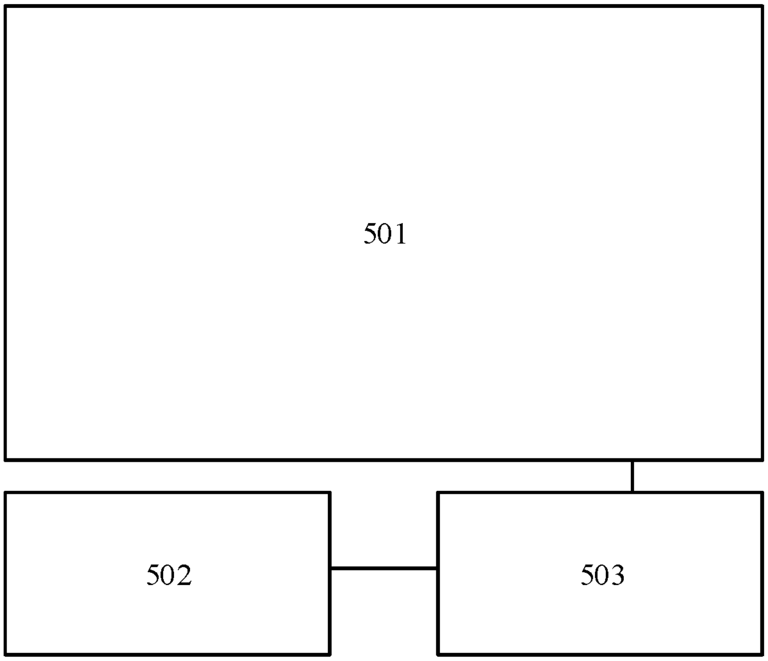
FIG. 5 is a schematic structural diagram of a display device provided by an embodiment of the present invention.

FIG. 5 is a schematic structural diagram of a display device provided by an embodiment of the present invention. The present invention also provides a display device, comprising:

a display panel 501 having a first display mode, wherein the frequency of the display panel 501 in the first display mode changes gradually;

a timing controller 502 configured to obtain the first frequency and the second frequency corresponding to two adjacent frames multiple times, determine whether the display panel 501 is in the first display mode according to the difference between the first frequency and the second frequency obtained multiple times, and output a voltage adjustment off signal when the display panel 501 is in the first display mode; and a power management chip 503 configured to receive a voltage adjustment shutdown signal to stop outputting the adjustment voltage to the display panel, thereby stopping the brightness adjustment function of the display panel 501.

Optionally, the timing controller 502 is configured to acquire the first frequency and the second frequency corresponding to the two adjacent frames 2fmax times. When the absolute value of the difference between the first frequency and the second frequency obtained each time is smaller than the frequency mode setting threshold C, it is determined that the display panel 501 is in the first display mode.

The frequency mode setting threshold C>(fmax−fmin)/step; fmax and fmin respectively represent the highest frequency and the lowest frequency corresponding to the display panel in the first display mode. step indicates the number of frequency gradients corresponding to the gradual transition of the display panel 501 from the lowest frequency fmin to the highest frequency fmax in the first display mode.

It can be understood that the display device includes a movable display device (such as a notebook computer, a mobile phone, etc.), a fixed terminal (such as a desktop computer, a TV, etc.), a measuring device (such as a sports bracelet, a thermometer, etc.) and the like.

In the descriptions, specific examples are used to illustrate the principle and implementation of the present invention. The descriptions of the above embodiments are only used to help understand the method and core idea of the present invention. For those skilled in the art, according to the idea of the present invention, there will be changes in the specific implementation and application range. In summary, the contents of this specification should not be construed as limiting the present invention.

What is claimed is:

1. A display method of a display panel, wherein the display panel has a first display mode, a frequency of the display panel in the first display mode gradually changes, and the display method of the display panel comprises:

determining whether the display panel is in a frequency conversion state;

if the display panel is in the frequency conversion state, acquiring a first frequency and a second frequency corresponding to two adjacent frames consecutively for multiple times;

determining whether the display panel is in the first display mode according to a difference between the first frequency and the second frequency obtained multiple times; and if the display panel is in the first display mode, turn off a brightness adjustment function of the display panel;

wherein a step of determining whether the display panel is in the first display mode according to the difference between the first frequency and the second frequency obtained multiple times comprises:

determining whether an absolute value of the difference between the first frequency and the second frequency acquired each time is less than a setting threshold for frequency mode;

if the absolute value of the difference between the first frequency and the second frequency acquired N consecutive times is less than the setting threshold for frequency mode, determining that the display panel is in the first display mode, wherein N is a frame number for display mode determination;

wherein the frame number for display mode determination is determined according to a first initial frequency and a second initial frequency when the display panel is in the frequency conversion state;

wherein the first initial frequency and the second initial frequency are respectively the first frequency and the second frequency corresponding to the two adjacent frames acquired for a first time; and wherein the first initial frequency corresponds to a frame preceding the two adjacent frames, and the second initial frequency corresponds to a frame following the two adjacent frames.

2. The display method of claim 1, wherein when the difference between the first initial frequency and the second initial frequency is greater than 0 and less than the frequency mode setting threshold, the frame number for display mode determination is equal to a highest frequency of the display panel corresponding to the first display mode.

3. The display method of claim 1, wherein when the difference between the second initial frequency and the first initial frequency is greater than or equal to 0 and less than the frequency mode setting threshold, the frame number for display mode determination is equal to twice a highest frequency of the display panel corresponding to the first display mode.

4. The display method of claim 1, wherein C>(fmax-fmin)/step; and wherein C represents the frequency mode setting threshold, fmax and fmin respectively represent a highest frequency and a lowest frequency corresponding to the display panel in the first display mode, and step represents a number of frequency gradients corresponding to a frequency transition from the lowest frequency to the highest frequency in the first display mode of the display panel.

5. The display method of claim 1, wherein the step of determining whether the display panel is in the first display mode according to the difference between the first frequency and the second frequency obtained multiple times further comprises:

if the absolute value of the difference between the first frequency and the second frequency is greater than the frequency mode setting threshold, determining that the display panel is not in the first display mode;

wherein the display method further comprises:

when the display panel is not in the first display mode, controlling the brightness adjustment function of the display panel to be in an on state.

6. The display method of claim 1, wherein before a step of if the display panel is in the frequency conversion state, acquiring the first frequency and the second frequency corresponding to the two adjacent frames consecutively for multiple times further comprises:

controlling the brightness adjustment function of the display panel to be in an on state.

7. A display device, comprising:

a display panel having a first display mode, wherein a frequency of the display panel in the first display mode gradually changes;

a timing controller configured to acquire a first frequency and a second frequency corresponding to two adjacent frames multiple times, determine whether the display panel is in the first display mode according to a difference between the first frequency and the second frequency obtained multiple times, and output a voltage adjustment off signal when the display panel is in the first display mode; and a power management chip configured to receive the voltage adjustment off signal to stop outputting an adjustment voltage to the display panel, thereby stopping a brightness adjustment function of the display panel;

wherein determining whether the display panel is in the first display mode according to the difference between the first frequency and the second frequency obtained multiple times comprises:

if an absolute value of the difference between the first frequency and the second frequency acquired N consecutive times is less than a setting threshold for frequency mode, determining that the display panel is in the first display mode, wherein N is a frame number for display mode determination;

wherein the frame number for display mode determination is determined according to a first initial frequency and a second initial frequency when the display panel is in a frequency conversion state;

wherein the first initial frequency and the second initial frequency are respectively the first frequency and the second frequency corresponding to the two adjacent frames acquired for a first time; and wherein the first initial frequency corresponds to a frame preceding the two adjacent frames, and the second initial frequency corresponds to a frame following the two adjacent frames.

8. The display device of claim 7, wherein the timing controller is configured to acquire the first frequency and the second frequency corresponding to the two adjacent frames 2fmax times and determine that the display panel is in the first display mode when an absolute value of the difference between the first frequency and the second frequency obtained each time is less than a frequency mode setting threshold;

wherein the frequency mode setting threshold represents C>(fmax-fmin)/step; and wherein fmax and fmin respectively represent a highest frequency and a lowest frequency corresponding to the display panel in the first display mode, and step represents a number of frequency gradients corresponding to a frequency transition from the lowest frequency to the highest frequency in the first display mode of the display panel.

9. A display method of a display panel, wherein the display panel has a first display mode, a frequency of the display panel in the first display mode gradually changes, and the display method of the display panel comprises:

determining whether the display panel is in a frequency conversion state;

if the display panel is in the frequency conversion state, acquiring a first frequency and a second frequency corresponding to two adjacent frames consecutively for multiple times;

determining whether the display panel is in the first display mode according to a difference between the first frequency and the second frequency obtained multiple times, wherein a step of determining whether the display panel is in the first display mode according to the difference between the first frequency and the second frequency obtained multiple times comprises determining whether an absolute value of the difference between the first frequency and the second frequency acquired each time is less than a setting threshold for frequency mode; and if the display panel is in the first display mode, turn off a brightness adjustment function of the display panel;

wherein the step of determining whether the display panel is in the first display mode according to the difference between the first frequency and the second frequency obtained multiple times comprises:

if the absolute value of the difference between the first frequency and the second frequency acquired N consecutive times is less than the setting threshold for frequency mode, determining that the display panel is in the first display mode, wherein N is a frame number for display mode determination;

wherein the frame number for display mode determination is determined according to a first initial frequency and a second initial frequency when the display panel is in the frequency conversion state;

wherein the first initial frequency and the second initial frequency are respectively the first frequency and the second frequency corresponding to the two adjacent frames acquired for a first time; and wherein the first initial frequency corresponds to a frame preceding the two adjacent frames, and the second initial frequency corresponds to a frame following the two adjacent frames.

10. The display method of claim 9, wherein when the difference between the first initial frequency and the second initial frequency is greater than 0 and less than the frequency mode setting threshold, the frame number for display mode determination is equal to a highest frequency of the display panel corresponding to the first display mode.

11. The display method of claim 9, wherein when the difference between the second initial frequency and the first initial frequency is greater than or equal to 0 and less than the frequency mode setting threshold, the frame number for display mode determination is equal to twice a highest frequency of the display panel corresponding to the first display mode.

12. The display method of claim 9, wherein C>(fmax-fmin)/step; and wherein C represents the frequency mode setting threshold, fmax and fmin respectively represent a highest frequency and a lowest frequency corresponding to the display panel in the first display mode, and step represents a number of frequency gradients corresponding to a frequency transition from the lowest frequency to the highest frequency in the first display mode of the display panel.

13. The display method of claim 9, wherein the step of determining whether the display panel is in the first display mode according to the difference between the first frequency and the second frequency obtained multiple times further comprises:

if the absolute value of the difference between the first frequency and the second frequency is greater than the frequency mode setting threshold, determining that the display panel is not in the first display mode;

wherein the display method further comprises:

when the display panel is not in the first display mode, controlling the brightness adjustment function of the display panel to be in an on state.

14. The display method of claim 9, wherein before a step of if the display panel is in the frequency conversion state, acquiring the first frequency and the second frequency corresponding to the two adjacent frames consecutively for multiple times further comprises:

controlling the brightness adjustment function of the display panel to be in an on state.

* * * * *